Oct. 13, 1931.    B. S. FRANKLIN    1,826,762
RATIO RECORDER
Filed Nov. 20, 1924    4 Sheets-Sheet 1
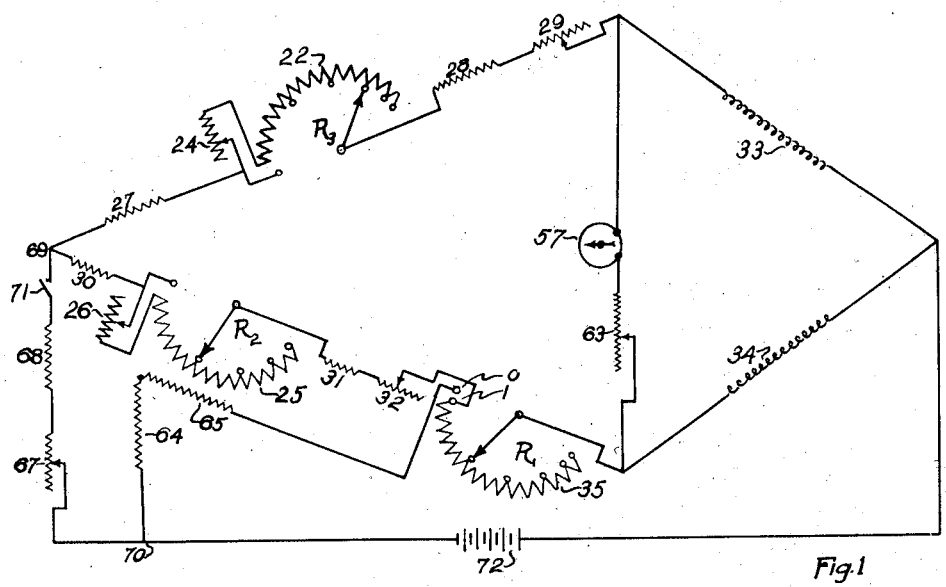
Fig.1
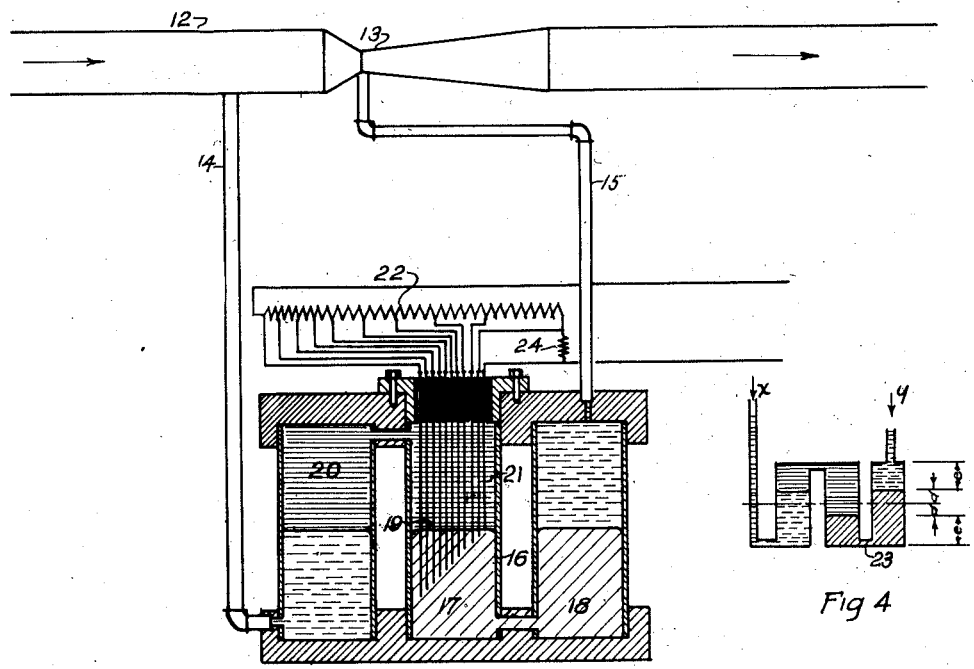
Fig 3
Fig 4
INVENTOR
Bernard S. Franklin Oct. 13, 1931.    B. S. FRANKLIN    1,826,762
RATIO RECORDER
Filed Nov. 20, 1924    4 Sheets-Sheet 3
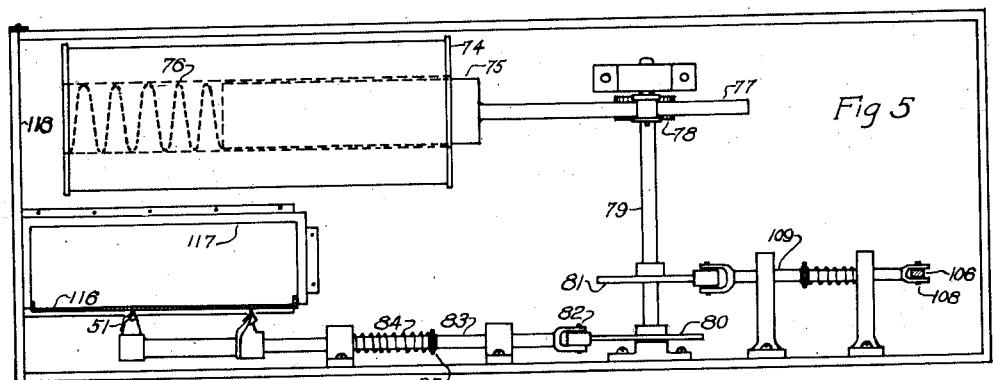
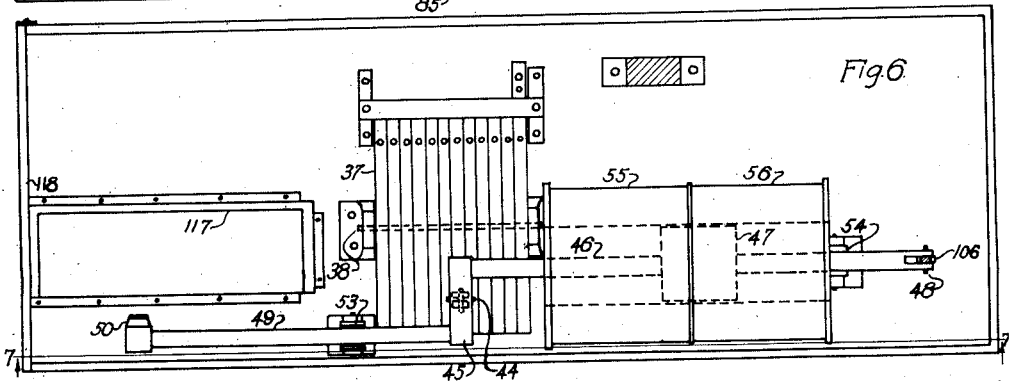
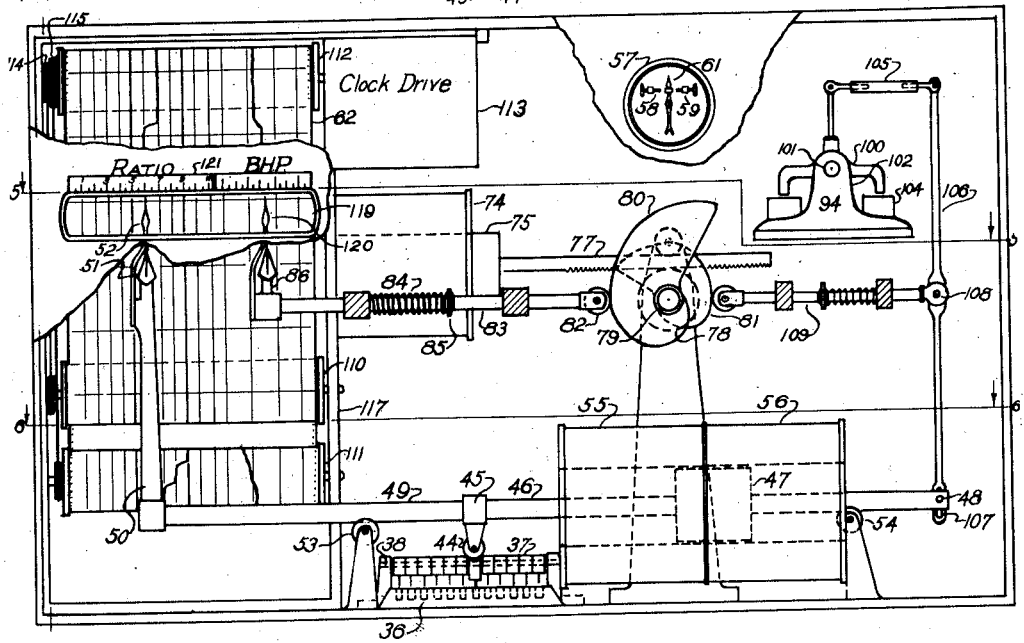
INVENTOR
Bernard S. Franklin Oct. 13, 1931.  B. S. FRANKLIN  1,826,762
RATIO RECORDER
Filed Nov. 20, 1924    4 Sheets-Sheet. 4
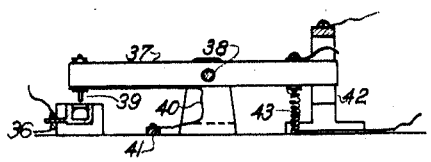
Fig 8
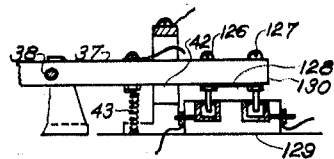
Fig 9
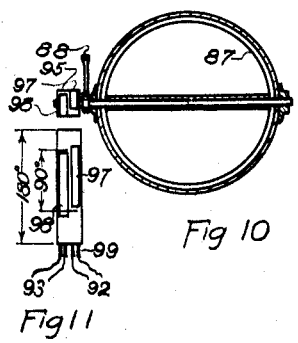
Fig 10
Fig 11
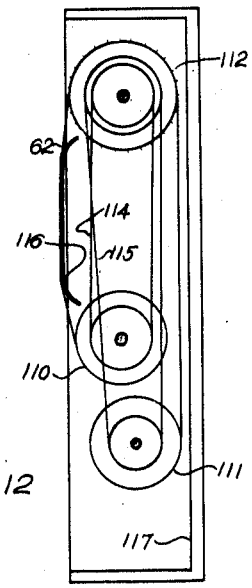
Fig 12
INVENTOR
Bernard S. Franklin.

Patented Oct. 13, 1931

1,826,762

UNITED STATES PATENT OFFICE

BERNARD S. FRANKLIN, OF TROY, NEW YORK

RATIO RECORDER

Application filed November 20, 1924. Serial No. 751,198.

This invention relates to a novel method whereby the ratios of two factors may be recorded. The same apparatus may serve to indicate the instantaneous values of such ratios.

The primary object of this invention is to provide a method, and apparatus therefor, to accomplish division, wherein the dividend, divisor, and their quotient may be located at distant or adjacent points, in any relative location whatsoever, their only interconnection being by means of electrical conductors.

In some devices quotients have been obtained in the form of certain indicated ratios. Thus there have been instruments to show when a certain correct relation existed between one quantity and another. Some of these made use of the ratio indicated by the resistances in the arms of a Wheatstone bridge. In one form in which my invention may be applied I also may use a Wheatstone bridge, but only as one of several possible ways of comparing equal resistances, and not as a direct measure of a ratio of resistances.

Such prior devices could only indicate the existence or non existence of a certain desirable ratio. An object of my invention is to provide a device which will record and indicate the actual numerical values of a quotient, as well as deviations from a desirable relation, assuming such to be known.

There are numerous ways to apply my invention within its scope of novelty. The following embodiment, which records the ratio between the flow in two conduits, has been chosen by way of illustration.

The primary object of the embodiment here disclosed is to record the ratio of the steam flowing from a boiler to the combustion air flowing to the boiler. A further object of the invention is to record on the same record chart the amount of steam flowing from the boiler. A further object is to automatically control the damper to maintain a given ratio of steam to air.

As is well known to mechanical engineers, the most desirable ratio of steam to air is not a constant, but varies according to the load on the boiler. A further object of the invention in the form here described is to automatically vary the ratio which the damper regulator maintains when the load on the boiler changes.

My method for obtaining and recording the ratios of distantly located quantities is based on the use of logarithms, a process well known in mathematics. Their use makes it possible to obtain a quotient by subtraction. At some point a force, or a level, or any quantity whose measurement is desired, moves an element an amount proportional to one factor. In moving this amount the element moves another element an amount proportional to the logarithm of the factor, or it may cut in resistances proportional to the amount of the logarithm of the factor, or in any other suitable way change the factor to its logarithm. Similarly at another point the value of another factor is transposed to the value of its logarithm. Then at a third point these two values are subtracted, and the resulting logarithm is then changed, by means of a logarithmic scale interposed in any suitable manner, to the value of the antilogarithm, which is the desired quotient.

The flow of steam is measured by the difference in level of a conducting fluid in a U tube which is connected to a Venturi meter, a thin plate orifice, or a Pitot tube in any of the ways known to the art. This change in level varies a resistance proportionally to the logarithm of the rate of steam flow. There is a similar unit on the air pipe. By means of a Wheatstone bridge a third resistance, located at the recorder, is made equal to the difference between the preceding two resistances, and has, therefore, a resistance value proportional to the logarithm of the ratio of steam to air flow. This third resistance is automatically varied to bring the bridge to balance whenever deflections of a galvanometer across the bridge show it to be unbalanced. The element which varies this resistance, in moving, records the ratio on a moving record chart. In moving, the element also controls the circuit to a reversing motor which varies the position of the damper in the air conduit.

The resistances in the Wheatstone bridge, while varying, cause the rate of flow of current thru the bridge even when balanced, to vary. This variation of current is made use of to record the rate of steam flow, and also to suitably alter that ratio of steam to air which the automatic damper regulator will seek to maintain.

The details of construction are described in connection with the following drawings, in which Figure 1 is a type wiring diagram for a Wheatstone bridge intended to make the wiring diagram shown in Fig. 2 more easily followed.

Fig. 3 shows a logarithmic resistance unit as applied to a steam or air conduit.

Fig. 4 is a diagrammatic representation of a U tube.

Fig. 5 is a plan view of the recording instrument taken on the line 5—5 in Fig. 7, omitting the record rolls and what is shown by Fig. 6.

Fig. 6 is a plan view of the recording instrument taken on the line 6—6 in Fig. 7, omitting the record rolls.

Fig. 7 is a partially sectioned front elevation of the recording instrument taken on the line 7—7 in Fig. 5.

Figure 2:
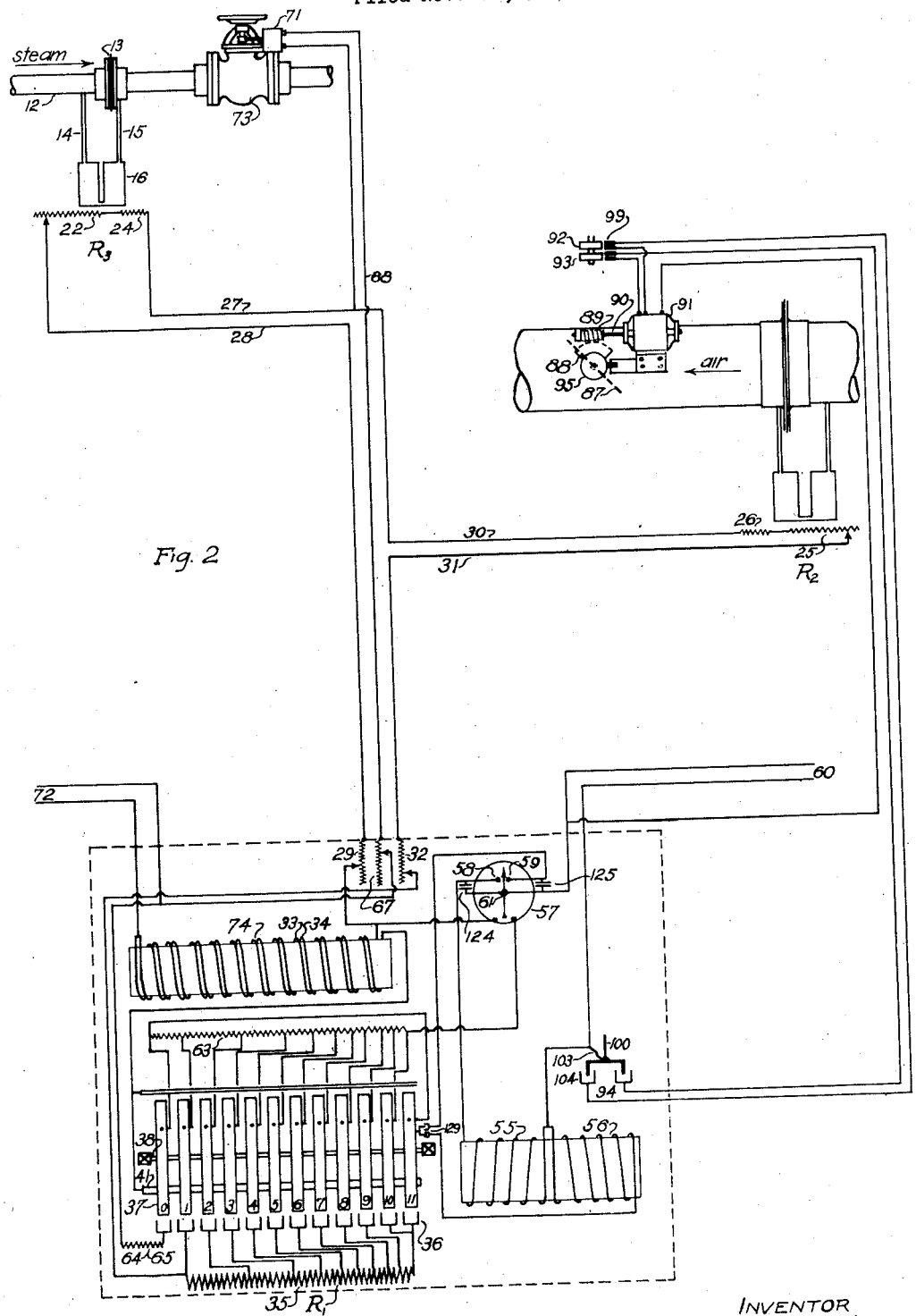
Fig. 2 is a wiring diagram of the apparatus.

Figures 5, 6, and 7 omit the actual resistances and condensers shown in Fig. 2 as they may be placed wherever convenient within the casing.

Fig. 8 is a detail of levers 0 to 10 in Figs. 2 and 6.

Fig. 9 is a detail of one end of lever 11 in Figs. 2 and 6.

Fig. 10 shows the method of preventing overtravel by the motor controlled damper.

Fig. 11 is a development of the half of the surface of 95 in Fig. 10.

Fig. 12 shows a side elevation of the record sheet container, in reversed position in order to show the pulleys and belting as visible instead of invisible lines.

Referring first to Fig. 3, 12 is the steam line leading from the boiler. In it is a Venturi tube 13 (shown in Fig. 2 in the more commercial form as a thin plate orifice) having the high pressure pipe 14 and the low pressure pipe 15. These pipes lead to the mercury U tube 16, mercury being in the chamber 17 and 18. The pressure from the pipe 14 is transmitted to the mercury surface 19 thru the inverted chamber 20 filled with oil. The object of this oil is to place a nonconducting medium around the conductors 21 to prevent their being short circuited by a fluid other than the mercury. When there is no flow in the steam pipe 12 the mercury assumes its own level, and all of the conductors 21 are short circuited, as shown, and they in turn short circuit all of the resistance 22. When flow begins there is a difference in pressure in pipes 14 and 15, which causes a depression of the mercury level 19, so making effective some sections of the resistance 22.

The diameters of the tubes 17, 18, and 20 may be of any relative magnitude, depending on the difference in pressure to be encountered. In this example I have shown their diameters equal, as a simple case. I shall also neglect the volume occupied by the conductors 21, as they may be imbedded in the walls of the tube 16, or they may be of small diameter.

Let $S'$ be the specific gravity of mercury, and $S''$ that of the oil. Referring to Fig. 4 showing a mercury depression equal to $d$, it will be seen that summing the pressures either side of point 23 in terms of head of water the following equations apply.

$$x+eS'+2dS''+eS''-eS''-2d-e+e+2d+e=eS'+2dS'+e+y$$
$$x+2dS''=y+2dS'$$
$$x-y=2d(S'-S'')$$

Thus the difference in head of water in pipes 14 and 15 is in simple and easily calculated relation to the mercury depression.

The difference in head in pipes 14 and 15 is proportional to the square of the velocity of steam flow in the pipe 12. This velocity is therefore proportional to $$\sqrt{d}.$$

The taps to resistance 22 are therefore located by obtaining the logarithm of the square root of the depression $d$ which just opens the circuit of that conductor 21 which is going to the tap specified. The resistance values may be conveniently taken in hundreds of ohms instead of in ohms. Thus the steam flow produces a resistance value of 22 that is always proportional to the logarithm of the rate of steam flow.

A fixed adjustable resistance 24 is added to the variable resistance just described as a factor resistance. The addition of this resistance to the logarithm of $$\sqrt{d}$$

is the same as multiplication by its antilogarithmic value. This resistance is made such that its antilogarithmic value will be a factor which will allow for the difference in the specific gravities of mercury and the oil, as compared with water; the difference in length of successive conductors 21; difference in diameters of the legs of the U tube, if such a difference exists; the mouth and throat areas of the Venturi tube, and the coefficient of the Venturi tube; the density of the fluid flowing thru the tube; and any artificially introduced factor to make a more satisfactory range of values for the ratio of steam to air. For example, the logarithm of 1 is zero. Zero resistance is the smallest that a resistance can become. This means that ratios greater than one are the only ones recordable. If, however, a factor resistance equal to the logarithm of 10 is introduced, (1x100=100 ohms in this case), then recorded, ratios of 1 to 10 will really be 0.01 to 0.1, and may be so graduated on the record chart.

The flow measuring unit for the air conduit will not be described in detail. It is similar to that just described except that in place of mercury a lighter conducting fluid is used. It may also have a factor resistance.

In Fig. 2 the fixed adjustable resistances 29 and 32 have been added to equalize the line resistances (27+28) and (30+31). These are desired not only equal, but also known in value in order that the measuring solenoid 74 may be calibrated for known current values. Resistances 29 and 32 are therefore made of a value greater than any line resistances likely to be encountered, and their full resistance values are later cut down by the amount of the resistances of the lines as installed. The totals will then be equal and known in value. For similar reasons the resistance 67 is used, it adding to the natural resistance of line 68 a resistance such that the total will be a known predetermined value.

Adverting now to Fig. 1, it is seen that the first variable logarithmic resistance, described in Fig. 3, is 22, that the second variable resistance is 25, and that the factor resistances are 24 and 26. Let 22+24 be $R_3$, 25+26 be $R_2$, and 35 be $R_1$. Omitting resistances 29 and 32 from present consideration, as their use is solely to equalize the resistances of the interconnecting lines 27, 28, 30, and 31, it is seen, since impedances 33 and 34 are made equal in resistance, that $R_1+R_2=R_3$ when the bridge is balanced. Therefore $R_1=R_3-R_2$.

Since $R_3$ is the logarithm of the rate of steam flow, and $R_2$ is the logarithm of the rate of air flow, then $R_1$ is the difference in logarithms, or the logarithm of the ratio of steam to air flow.

Adverting now to Fig. 2 the logarithmic resistance $R_1$ is shown at 35. The taps from it lead to the mercury contact cups 36. This figure is not true projection, and is only used for the wiring connections. Figs. 6, 7, 8, and 9 are referred to in what follows altho in these figures the actual resistances are not shown as they may be positioned where convenient. Insulation levers 37, pivoted at 38, carry contacting elements 39 (Fig. 8), which are connected by pigtail connections 40 to the bus bar 41. The opposite ends of levers 37 are biased downwards against the stop bar 42 by light springs 43, which are incidentally used as conductors for a purpose later explained.

Riding over the levers 37, and adapted to depress any one of them, is the wheel 44 (Fig. 7) carried on the rigid offset 45. A rod 46, fixed to the offset 45, carries an iron core 47 and the pin 48. A rod 49 carries an arm 50 to which is fixed a pen 51 and a pointer 52. The rods 46 and 49 are supported by wheels 53 and 54, one of which may be a rubberized wheel geared to a fan to dampen the speed or motion of the core 47.

The core 47 is influenced by two solenoids 55 and 56, located end to end. When solenoid 55 is energized the core will move to the left, and when core 56 is energized it will move to the right. The galvanometer 57 is constructed for ruggedness rather than sensitivity, and is adapted by its deflections to close electrical circuits thru contacts 58 or 59 to the solenoids 55 or 56, thence to a source of energy 60 and back to its pointer 61. These circuits are so wired that when the bridge is unbalanced the galvanometer energizes that solenoid which moves the armature 47 and the wheel 44 in the direction of that lever 37 which contacts thru the mercury cups 36 with a value of the resistance 35 such that it tends to bring the bridge to balance. When balance is attained the galvanometer pointer returns to zero, the solenoid circuit is opened, and the armature 47, wheel 44, and pen arm 50 remain at rest.

If the galvanometer 57 is so sensitive that it is affected by an unbalance of the bridge represented by a resistance value equal to less than one half the resistance value between the taps 36 then hunting is apt to occur. That is, a value of resistance 35 somewhere between its tapped values may balance the bridge, and wheel 44 will hunt back and forth over the levers either side of the correct value in attempt to satisfy the bridge balance. The contacts 58 and 59 on either side of the pointer 61 are on adjusting screws and these may be spaced at such a distance that hunting will not occur. This can only be done if resistance 35 is tapped at equal intervals, in which case the ratio would be recorded by pen 51 according to a logarithmic scale.

If it is desired to have the pen 51 record on chart 62 to a uniform rather than a logarithmic scale, as in this embodiment, certain additional apparatus is necessary. Resistance units between the mercury cups 36 will then be in logarithmic ratio. With ten levers as shown, and with an anticipated ratio range of 1 to 10, the resistances to the taps will be equal to the logarithms of 1 to 10 taken in hundreds of ohms. It is clear that with an anticipated range of 1 to 5, ten levers may be retained if desired, and the resistances to the taps will be proportional to the logarithms of 1, 1.5, 2, 2.5, and so on to 5.

If contacts 58 and 59 are now spaced to prevent hunting between levers representing numbers 9 and 10 (Fig. 2) then hunting is apt to occur between lower numbers such as one and two because of the greater difference in the logarithms of adjacent smaller than adjacent larger numbers. To prevent this, as the wheel 44 rides over the smaller numbers, the galvanometer 57 is rendered less sensitive by the interposition of resistance 63 in series with it. This is a variable resistance, contact with which is made by the ends of levers 37 thru the biasing springs 43 (Fig. 8). It is seen from Fig. 2 that the smaller the number to be recorded, the greater the amount of resistance connected in series with the galvanometer, and these resistance values are so chosen that they will prevent hunting.

The operation of the device as a ratio recorder is now probably understood. $R_3$ always exists as the logarithm of the rate of steam flow. Any change in this rate results instantly in a change of the resistance value of $R_3$. Similarly $R_2$ is dependent on the rate of flow of combustion air to the furnace. In the case of forced draft the air measurement may be made before the fire box, and the blower speed varied for air control. In the case of natural draft the air measurement may be approximated indirectly by a measurement of the change in draft pressure across the boiler setting, or the gaseous products of combustion, and the damper position varied for air control. In the case shown in Fig. 2, there is a damper in the air conduit, one blower supplying more than one furnace, but each furnace having its own damper.

Suppose that the boiler is 75% efficient, and that it is using about 50% excess air. The ratio of steam to air is then about 0.6. Assuming that the previously mentioned factor of 10 has been introduced, the modified or scaled ratio is then 6, and the pointer 52 accordingly indicates 6, as shown in Fig. 7. Now suppose the steam consumption decreases. $R_3$ decreases, the bridge is unbalanced, the galvanometer pointer deflects to the left, the solenoid 55 is energized, and the core 47 begins to move left. The wheel 44 rides over lever 5 instead of lever 6, and this reduces the resistance of $R_1$ so that the bridge balance may be satisfied. The galvanometer pointer then breaks the circuit thru solenoid 55, and the pointer 52 will indicate the modified or apparent ratio 5. So, under normal operating conditions, the pointer 52 always indicates and the pen 51 records the steam to air ratio according to a given scale. The parts 45, 46, 47, 49, and 50 may be made ruggedly, as the solenoids 55 and 56 may be wound the amount found necessary to properly influence the armature 47. The tendency of this high inductance to cause sparking at the contacts 58 and 59 is partially counteracted by the introduction of the condensers 124 and 125.

Under abnormal conditions the ratio of steam to air will come outside of the limits of the instrument. A condition never likely to occur is that of no air flow, making the ratio infinite, and a condition more frequently liable to occur is that of no steam flow, making the ratio zero.

In the event of the steam flow being temporarily stopped $R_3$ becomes zero (22+24), $R_1$ (35) is automatically reduced to zero, and the pen 51 moves to its extreme position on the chart 62. $R_2$ (25+26) will ordinarily continue to have a finite value, so that the bridge will remain unbalanced, sending current thru galvanometer 57, and a heavy current thru the solenoid 55. To prevent this, when wheel 44 rides beyond lever 1 onto lever 0 depression of the latter opens the bridge circuit thru $R_2$ (because lever 1 rises) and closes the circuit thru artificial line resistances 64 and 65 (Figs. 1 and 2). Resistance 65=30+31+32, and resistance 64=67+68 therefore the effect is simply to short circuit $R_2$, but the short circuit is performed at the recording instrument instead of at $R_2$. The corner of the bridge is moved from point 69 to 70 but this does not affect the operation.

$R_2$ being in effect made zero the bridge comes to balance, the current thru the galvanometer becomes zero, and the circuit thru the solenoid 55 is opened, preventing a useless waste of current. It may here be pointed out that current flows thru this solenoid just for short intervals and only upon changes in the steam air ratio.

The only circuit in which current flows continuously is across the Wheatstone bridge. This current is small as at least the resistances 33, 34, 27, 28, 29, 30, 31, 32, 67, 68, 64, 65, are always in the circuit. Furthermore, this current is not wasted for, as will be described subsequently, it is used to record the rate of steam flow and also to vary the steam air ratio maintained by the air regulator. To prevent flow of this current in case of a boiler shutdown for repairs or cleaning, the switch 71 is put in the circuit of the constant potential current source 72, and this switch is automatically opened when the main steam valve 73 is closed.

In the event of the air flow being reduced to zero, the ratio becomes infinity. The wheel 44 will ride over the levers onto lever 11. Lever 11 is extra long, and has on its extension 130 (Fig. 9) the contacts 126 and 127 which are connected by the conducting plate 128. These contacts are adapted, normally, to close the circuit of solenoid 56 thru the mercury contact cups 129, (Figs. 9 and 2). When $R_2$ becomes zero, and lever 11 is depressed, the circuit of solenoid 56 is opened, and the armature 47 remains at rest. The circuit thru 55 remains closed, so that when the air supply begins again, the armature 47 may be attracted back to the proper ratio indication. $R_1$ cannot balance $R_2$ with $R_2$ equalling zero because the first step of $R_3$ is greater than all of $R_1$.

The two equal resistances 33 and 34 forming the right side of the Wheatstone bridge (Fig. 1) compose, in the actual embodiment, the windings of the solenoid 74 (Figs. 2, 5, 7). The solenoid has a double wire winding, each of the wires being one of the resistances 33 and 34. The armature 75 is influenced in opposing directions by the spring 76 and the solenoid 74, and its equilibrium position is a function of the rate of current flow thru the solenoid. Since the electromotive force applied across the bridge is substantially constant the current thru it will vary inversely as the resistance. This in turn is a function of the rate if flow thru the steam pipe 12, since that is what varies the resistance $R_3$. $R_1 + R_2$ becomes almost instantly equal to $R_3$.

The armature 75 has fixed to it the rack 77 which engages with the gear 78. The gear ratio is so chosen that the change in armature location from zero steam flow to maximum steam flow will revolve the gear 78 no more than, but preferably nearly, one revolution. Gear 78 turns the shaft 79 to which is fixed cams 80 and 81. The cam 80 actuates the follower 82 and the rod 83. This bears lightly against the cam because of the pressure of spring 84 on collar 85. At the far end of rod 83 is fixed the stylus 86. The cam 80 is so shaped that it will correct for the irregularities introduced by the logarithmic values of the resistance $R_3$, and the fact that $R_3$ is only a part of the total resistance across the bridge. Pen 86 may thus be arranged to record the rate of steam flow on a uniformly graduated chart, which may, if desired, superimpose the graduations for the steam air ratio record, or be adjacent it, as shown in the present embodiment.

The air control is by means of damper 87 which is turned by worm gear sector 88, which in turn is in mesh with the worm 89. This is fixed to the shaft 90 of the reversing motor 91. In the motor circuit there are included the two stop switches 92 and 93, and the control switch 94.

The stop switches 92 and 93 consist of a drum of insulation 95 which is fixed to the damper shaft 96. Imbedded in the insulation are two conducting surfaces 97 and 98 (Fig. 10). Contacting with these are the four brushes 99, arranged so that as long as a pair of brushes contacts the conducting plate then the circuit thru that pair of brushes is closed. When motor 91 has turned damper 87 to a nearly closed position the contacting segment 98 (Fig. 11) will just have passed two of the brushes 99, and the motor will cease rotating. The other circuit which returns the damper to an open position will remain closed thru the other two brushes and the contacting segment 97. In a similar way the segment 97 will just pass the brushes when the damper is fully open, but segment 98 will be in contact with its brushes.

The control switch 94 consists of a bifurcated element 100 which turns on a shaft 101 mounted in fixed insulation bearings 102. A pigtail connection 103 (Fig. 2) conducts current to the element 100, and this current may be transmitted to either of the mercury cup contacts 104. To the upper part of the bifurcated switch element is connected the insulation link 105. This receives its motion from the lever 106 which is articulated to the armature rod 46 by means of the pin 48 and slot 107. The lever 106 is pivotally connected at 108 to the sliding rod 109.

If a fixed ratio of steam to air were desirable it is seen that by placing rod 109 in such a position that the pin 108 is directly above the pin 48 when the pen 51 is recording the desirable ratio, then the damper will tend to maintain that ratio. Any change in the ratio will cause a movement of pin 48, which, swinging the lever 106, will cause switch 94 to close that motor circuit which will move the damper to correct the change. The damper is driven slowly to prevent overtravel during this correction.

However, as pointed out previously, the desirable ratio is not constant, but variable, and to this end rod 109 is moved by the cam 81 as the load on the boiler changes. In the case shown the cam 81 moves the rod 109 one half of the distance by which the new desirable ratio position differs from its former position.

The record chart 62 has three lines heavier than the ordinary divisions printed on it. The center line shows the average desirable ratio of steam to air, and the other two the maximum and minimum ratios desirable.

The chart is unwound from roll 110 (Fig. 12) onto take up roll 111 by means of driving roll 112. The drive roll 112 is rotated by the clockwork mechanism 113. Rolls 110 and 111 are driven by the light friction belts 114 and 115, and the pulley diameter ratios are such that the belts tend to rotate roll 110 slower and roll 111 faster than they actually do turn, so keeping the paper record sheet taut over the platen 116. The rolls and the clockwork drive are carried by a readily removable case 117 which can be slid out of the instrument for the replacement of sheets, and the winding of the clockwork, by opening the hinged side door 118.

There is a glass plate 119 set just above the ends of recording pens 51 and 86. The pointers 52 and 120 cooperate with the fixed scales 121 to permit the steam air ratio and the steam flow rate in boiler horsepower (specified pressure and superheat conditions) to be read.

Alternating current may be used at 60, and with due attention to the special problems involved, apparatus similar to that described may be designed to operate from an alternating current source at 72. With constant voltage mains, the sources 72 and 60 may be combined as one.

I do not wish to be limited to the use of resistances, impedances, or any other limitations implied by the described embodiment. My broad invention involves recording ratios at a point in any relative location to the dividend and divisor thru the use of logarithms. This principle is adapted to widely different applications. In the annexed claims I have attempted to protect myself broadly, but only in what I believe is my true invention.

What I claim is:

1. In combination, a variable impedance, a movable element which varies said impedance in proportion to the logarithm of its own motion, an electrical instrument controlling the position of said element, and means operated by said element during its motion to vary the sensitivity of said electrical instrument.

2. In combination, a U tube, a liquid in said U tube to be displaced by a difference in pressure applied to it, an impedance varied by the displacement of said liquid, said impedance being arranged to be varied in proportion to the logarithm of the difference in pressure raised to an exponential power.

3. In combination, a conduit, a U tube, a liquid in said U tube displaceable by a difference in pressure applied to it, means at the conduit to obtain said difference in pressure to be applied to said U tube to be used as a measure of the rate of flow in said conduit, and a means varied by said liquid in proportion to the logarithm of a mathematical function of the rate of flow.

4. In combination, a Wheatstone bridge including a measuring impedance and an adjustable impedance for balancing said bridge, a source of current for said bridge, and an electrical measuring device responsive to the rate of flow of current across said Wheatstone bridge even when the adjustable impedance is of proper magnitude to balance the bridge.

5. The combination with a Wheatstone bridge comprising a source of current for said bridge and five impedances, two fixed and equal and three variable and such that one a measuring impedance, equals the sum of the other two when the bridge is balanced, of an electrical instrument responsive to the rate of flow of current across said Wheatstone bridge when it is balanced so as to be an indication of the magnitude of the measuring impedance.

6. In a Wheatstone bridge, two equal inductive impedances comprising two arms of said bridge, an armature cooperating therewith, and a source of current connected across opposite corners of said bridge, said impedances being wound to similarly magnetically influence said armature in response to the rate of flow of current across said bridge between the corners to which the current source is connected.

7. Means including a moving element responsive to the ratio of the rates of flow in two conduits, means at one conduit to vary the flow therein, means associated with the moving element to automatically operate the flow varying means to maintain a predetermined ratio, and means for varying said ratio in a predetermined manner depending upon the rate of flow in the other conduit.

8. An electrical circuit comprising a symmetrical network of impedances, an instrument responsive to unbalance of the network, a balancing impedance varied by said instrument for correcting the unbalance, and means for altering the sensitivity of said instrument in dependence upon the magnitude of the balancing impedance.

9. An electrical circuit comprising a symmetrical network of impedances, an instrument responsive to unbalance of the network, a balancing impedance varied in unequal increments by said instrument for correcting the unbalance, and means for altering the sensitivity of said instrument according to the magnitude of the increments of variation of the balancing impedance but in inverse sense, so as to prevent both lag and hunting of the instrument.

10. Means including a moving element responsive to the ratio of the rates of movement of a plurality of substances, means to control the rate of movement of a substance, means associated with the moving element for operating the rate controlling means to maintain a predetermined ratio, and means for varying said predetermined ratio in a manner dependent upon the rate of movement of one of the substances.

11. Means to measure the rate of movement of a substance, means to transpose the measurement to a logarithmic value, means to measure the rate of movement of another substance, means to transpose the latter measurement to a logarithmic value, means including a moving element responsive to the difference of the logarithmic values to register the ratio of the rates of movement of the substances in linear proportion, adjustable means to control the rate of movement of one of the substances, and means associated with the moving element for so adjusting the rate controlling means upon departure of the registered ratio from a predetermined ratio as will tend to restore the predetermined ratio.

12. Means to measure the rate of movement of a substance, means to transpose the measurement to a logarithmic value, means to measure the rate of movement of another substance, means to transpose the latter measurement to a logarithmic value, means including a moving element responsive to the difference of the logarithmic values to register the ratio of the rates of movement of the substances in linear proportion, adjustable means to control the rate of movement of one of the substances, and means associated with the moving element for so adjusting the rate controlling means upon departure of the registered ratio from a predetermined ratio as will tend to restore the predetermined ratio, and means responsive to the rate of movement of one of the substances for varying said predetermined ratio in a predetermined manner depending upon said rate of flow.

13. In combination, two conduits for conducting fluid substances, means at each conduit to measure the velocity of flow therein comprising a U tube, a liquid in said U tube displaceable by a difference in pressure applied thereto, means at each conduit to obtain a difference in pressure to be applied to said U tube dependent upon the rate of flow, an impedance varied by displacement of said liquid in proportion to the logarithm of the rate of flow, a network of impedances in the form of a Wheatstone's bridge including the two aforesaid impedances and a balancing impedance, an instrument responsive to unbalance of the network for automatically varying said balancing impedance to correct unbalance, means for altering the sensitivity of the instrument in dependence upon the magnitude of the balancing impedance, means including an element moved upon variation of the balancing impedance for registering the ratio of the rates of flow in the two conduits, means at one conduit to vary the flow therein, means associated with the moving element to automatically operate the flow varying means to maintain a predetermined ratio, and a device responsive to the flow of current across the balanced impedance network for varying the predetermined ratio in a predetermined manner dependent upon the rate of flow of fluid in the other conduit.

BERNARD S. FRANKLIN.